United States Patent [19]
Mayo

[11] 4,072,973
[45] Feb. 7, 1978

[54] CAMERA SIGNAL SYSTEM FOR PORTRAIT TAKING

[76] Inventor: William D. Mayo, Green Glade Road, Phoenix, Md. 21131

[21] Appl. No.: 652,308

[22] Filed: Jan. 26, 1976

[51] Int. Cl.² ............................................. G03B 17/56
[52] U.S. Cl. .................................... 354/295; 354/128; 354/238; 354/290
[58] Field of Search ................. 354/76, 127, 128, 295, 354/354, 290, 237, 238, 293; 352/244; 340/221, 220, 371

[56] References Cited

U.S. PATENT DOCUMENTS

| | | | |
|---|---|---|---|
| 2,868,958 | 1/1959 | Bounds | 354/127 X |
| 3,538,822 | 11/1970 | Gilmer | 354/127 X |
| 3,634,846 | 1/1972 | Fogel | 340/221 X |
| 3,667,367 | 6/1972 | Miyagawa | 354/238 |
| 3,786,498 | 1/1974 | Lipe et al. | 340/371 |
| 3,812,506 | 5/1974 | Klebanow | 354/290 X |
| 3,852,788 | 12/1974 | Ueda | 354/293 |

FOREIGN PATENT DOCUMENTS

252,029   5/1966   Austria ............................... 354/238

Primary Examiner—Edna M. O'Connor
Attorney, Agent, or Firm—John F. McClellan, Sr.

[57] ABSTRACT

A camera signal system for portrait taking in which a sensory signal alerts animate subjects of photography, such as group-portraiture subjects, at a predeterminable time before exposure, usually from one to three seconds. The signal is preferably both audible, as a "beep", and visual, as a "funny face" which appears when lighted from behind, for relaxing and at the same time immobilizing the subjects. Both human-timed and adjustable-time and non-adjustable time automatically-timed embodiments are provided in clip-on, clamp-on, glue-on, screw-on, fabric attached and built-in versions, adapted for employment with a variety of cameras.

6 Claims, 20 Drawing Figures

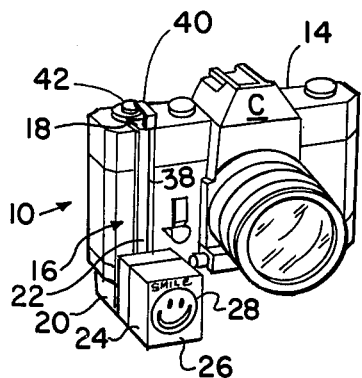
FIG.1a
FIG.1b
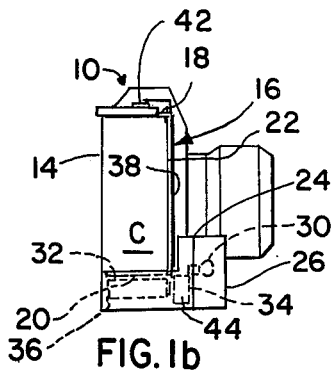
FIG.4a
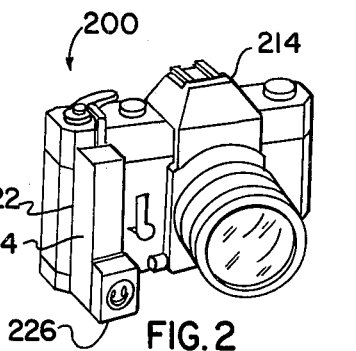
FIG.2
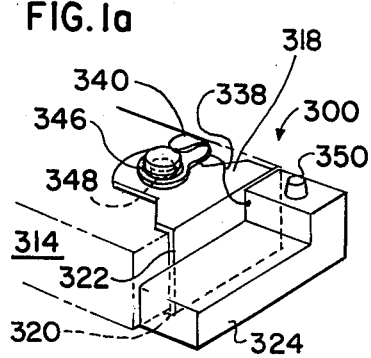
FIG.3
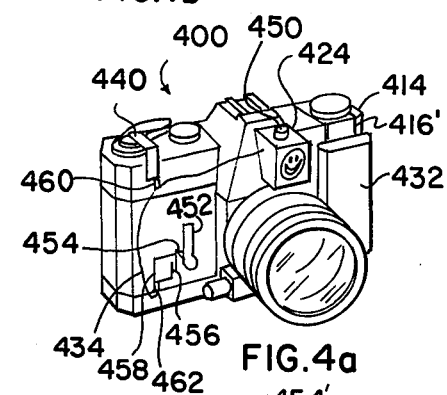
FIG.4d
FIG.4e
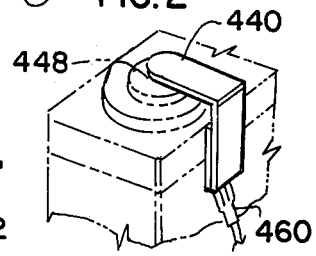
FIG.4b
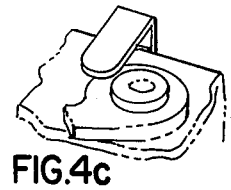
FIG.4c
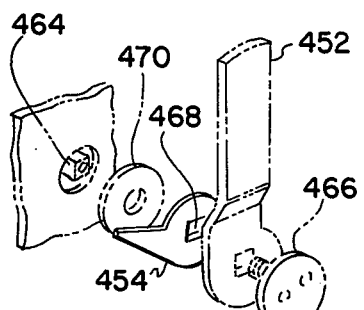
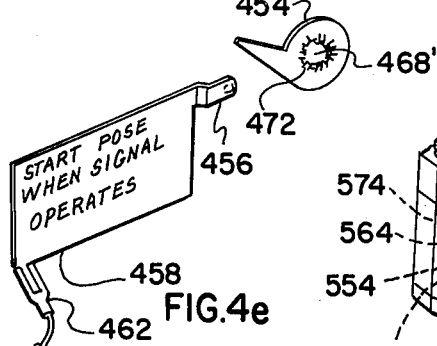
FIG.5
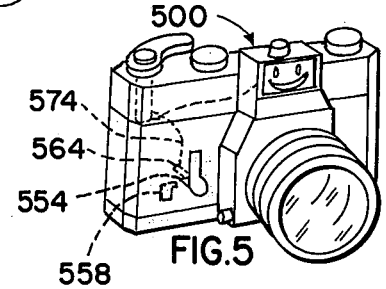
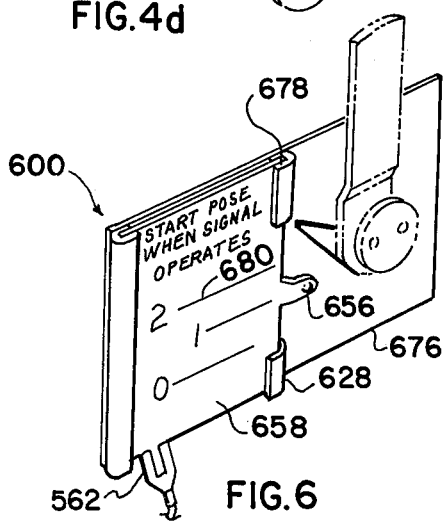
FIG.6
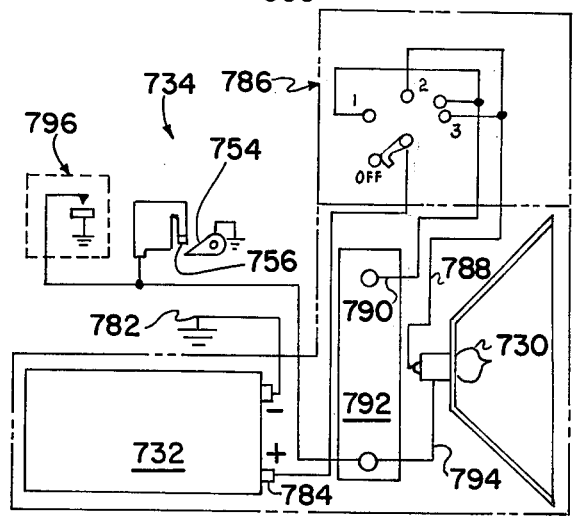
FIG.7

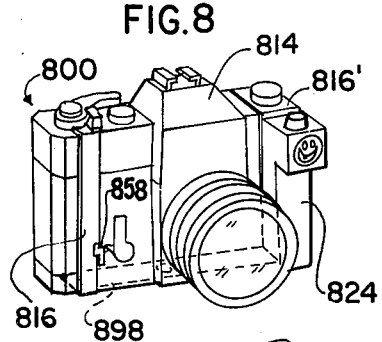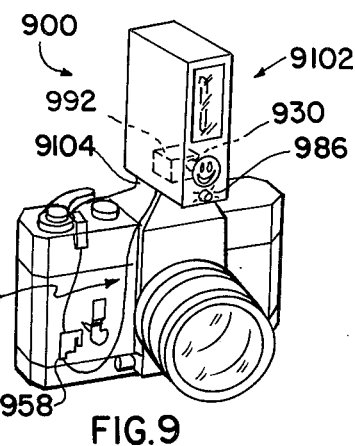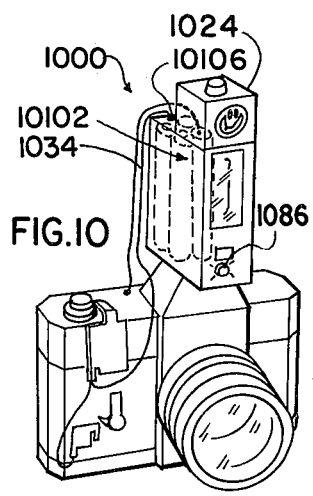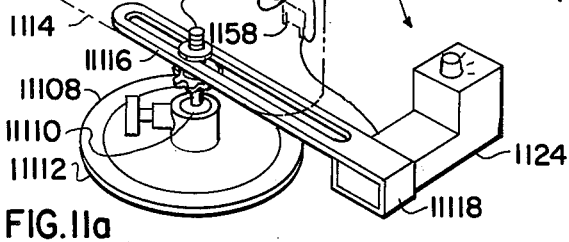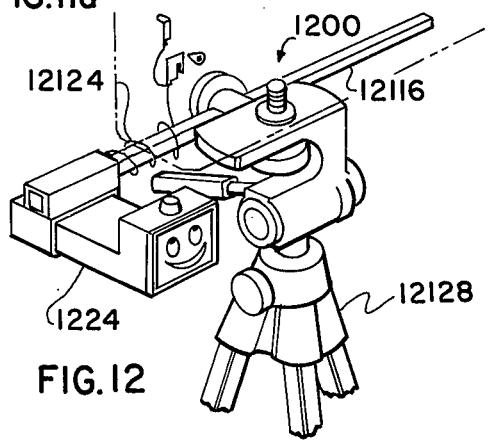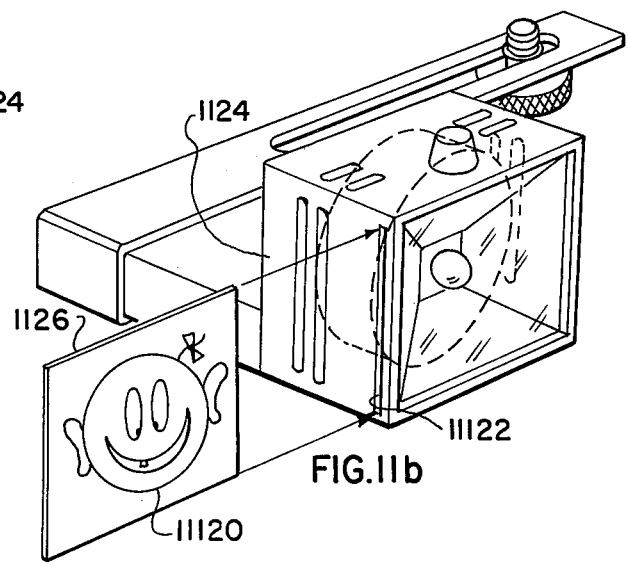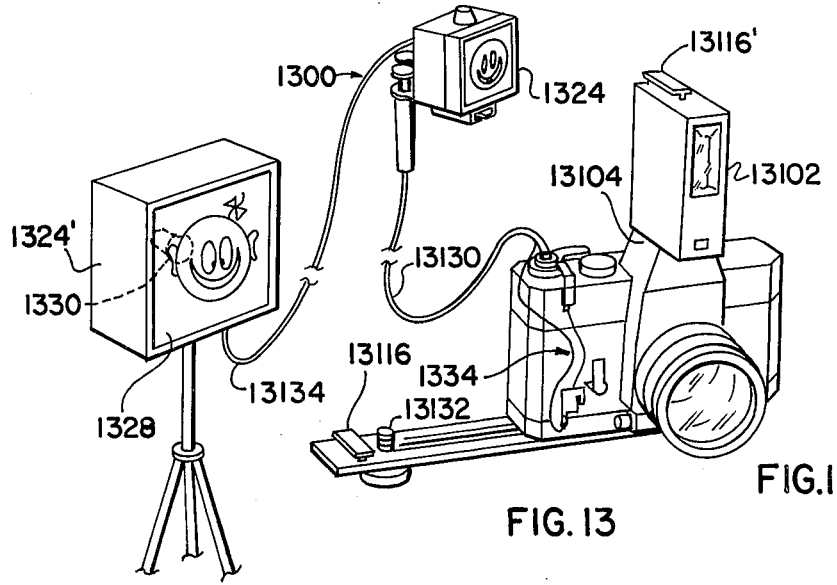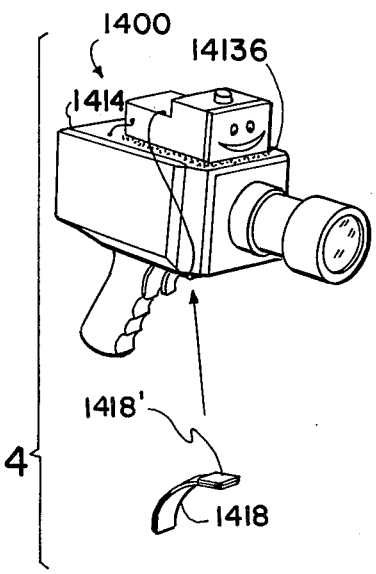

CAMERA SIGNAL SYSTEM FOR PORTRAIT TAKING

This invention relates generally to signal system for operation in combination with a camera to pose the subjects of portraits to be taken with the camera, prior to exposure.

A principal object of the invention is to provide a system which positively insures that camera subjects will have warning at a predeterminable time before shutter actuation in the taking of portraits, including group pictures.

Further objects are to provide a system as described which can give an audible signal or a visual signal or both simultaneously, either or both being dignified or humerous as desired.

Still further objects are to provide a system as described in which the predeterminable time is controllable manually or automatically.

Yet further objects are to provide a system as described in which almost any conventional camera can be made a composite part. This may be done as desired by having apparatus according to this invention friction-clipped to the camera in an instantly detachable manner as a completely separate subsystem, or by having the apparatus built into the camera, or by having the apparatus attached to or built into an accessory which is already designed to fasten as a standard appurtenance to the camera, or by having the apparatus attachable in various convenient other ways, as by screwing-on and as by attaching to a stand on which the camera may be mounted.

Yet further objects are to provide a system as described which is reliable, economical, durable, attractive in appearance, and safe, convenient and effective in use.

It is believed that no prior art devices have been disclosed which provide the advantages of the present invention.

In brief summary given for purposes of cursive description only and not as limitation, the invention includes switching means for association with camera shutter actuating means to actuate a signal prior to shutter actuation to notify animate subjects being photographed that an exposure is about to be made.

The above and other objects and advantages will become more apparent on examination of the following description, including the drawings, in which like reference numerals refer to like parts.

FIG. 1a is an isometric view;
FIG. 1b is a side elevational view;
FIG. 2 is an isometric view;
FIG. 3 is an isometric detail;
FIG. 4a is an isometric view;
FIG. 4b is an isometric detail, enlarged;
FIG. 4c is an isometric detail, enlarged;
FIG. 4d is an exploded isometric detail, enlarged;
FIG. 4e is an isometric detail, enlarged;
FIG. 5 is an isometric view;
FIG. 6 is an isometric detail, enlarged;
FIG. 7 is a schematic circuit diagram;
FIG. 8 is an isometric view;
FIG. 9 is an isometric view;
FIG. 10 is an isometric view;
FIG. 11a is a rear isometric detail;
FIG. 11b is a front isometric detail, enlarged;
FIG. 12 is an isometric detail;
FIG. 13 is an isometric view; and
FIG. 14 is an isometric view, partially exploded.

EMBODIMENT OF FIGS. 1 and 2

FIGS. 1a and 1b show the combination of a relatively conventional 35mm camera 14, which may be a Minolta Model SRT101 or the like, combined with a signal system in embodiment 10 in accordance with this invention.

The signal system mounts to the camera by means of a spring-steel frame 16 in squared "C" shape which has an upper arm 18 clipped over the camera top, a lower arm 20 clipped under the bottom of the camera, and an upright 22 at the front of the camera, connecting the arms. The frame makes electrical contact with the camera frame.

At the lower portion of the "C" shaped frame a housing 24 attached to it extends in a fore-and-aft direction from below the camera to a position in front of the camera, where a portion of the housing extends upwardly and frames, in front, a translucent window 26. The window preferably has a funny face 28, (FIG. 1a) or a word such as "SMILE", on the rear surface so as to become evident when illuminated from behind.

Behind the window an electric bulb 30 is mounted in position to illuminate it (FIG. 1b) and batteries 32 are stored in the housing together with an electric circuit 34 connecting them with the bulb.

One side of the electric circuit, as for example a line 36 from the batteries, is connected to the frame, and the other side of the circuit, as for example a line 38 from the bulb, rises with but is insulated from the upright arm of the "C" frame and terminates in a bare resilient leaf spring 40 cantilevered above the camera shutter release button 42. The leaf spring is preferably sufficiently big to cover the shutter release button so that in operation, in order to press the shutter release button it is therefore necessary first to press the leaf spring downward against it, thus closing the electric circuit and lighting the lamp and funny face before the shutter is actuated. The interval between actuation of the shutter is entirely within the control of the photographer, since the pressure necessary to ground the switch, that is to force the flat spring against the shutter release, is always less than that necessary to release the shutter. The two elements can be actuated in close sequence by a quick press, or in spaced sequence by a slower press.

As a further feature, an oscillator 44 (FIG. 1b) which may be coil-and-breaker actuated or tranducer and oscillator circuit actuated, may be provided. This may advantageously be in addition to the lamp, and actuated in parallel with it, to give simultaneous audible and visual signals, but it may be also substituted for the lamp if desired. The oscillator frequency may be selected to produce a squeal-like note, high in the audible range, for comic effect, or other audible tones may be used, such as a "tweet-tweet" modulation. Brightness of the display permits use in sunlight, although a slide-out sunshield may be employed if desired.

In any event, the combined effect of funny face and comical note unfailingly produces smiles upon demand insuring pleasant looks on the faces of subjects without effort and without necessity for extra effort in that direction by the photographer.

FIG. 2 illustrates a quick-clamp-on embodiment 200 of the invention similar to that of the preceding Figures, and similarly mounted.

However, to permit the camera 214 to be set flat on the bottom, and to add stiffness to the upright member 222 of the "C" shaped frame, the housing 224 is in the form of an "L" with the longer leg of the "L" secured to the upright member of the frame and the shorter leg of the "L" extending forwardly and framing window 226 at the forward end.

Operation is as described in reference to the preceding two Figures.

FIG. 3 illustrates a quick-clamp-on embodiment 300 compactly and easily attachable to camera styles such as camera 314 (detail in phantom) where there is little room at other locations for the complete unit. Housing 324 has side attachment as by cementing to a "C" clamp upright member 322, and extends horizontally forwardly. The lower leg 320 of the "C" clamp hooks under the camera, or a portion of it, and the upper leg 318 hooks over the top of the camera at the shutter release. The "C" clamp grounds to the camera frame as before with one side of the circuit grounded to the "C" clamp. Line 338 leads from the other side of the circuit to grounding switch 340 resiliently mounted in the upper leg of the "C" clamp as by an insulative ring 346, and covering the camera shutter release button 348.

When the grounding switch is depressed, first the signal system is actuated, and then the camera shutter is released as described in reference to the earlier Figures. When it is desired to photograph without actuation of the signal system, interrupter switch 350 can be thrown to break the circuit to the grounding switch. Alternatively, this can be a four-way switch as will be seen later.

FIGS. 4a and 4b show overall features of an automatic timer-option embodiment 400 of the invention in which the elements of the invention may be separately affixed to the camera 414 at various convenient locations, as by cementing in place, or by combined cementing of some elements and clamping of others.

For example, battery pack 432 is clamped in place on the far side or side opposite the shutter release button by a "C" clamp 416'. Housing 424 is cemented in place in central location above the lens, so that the subjects look directly in line with the lens. Flat leaf-spring switch element 440 covers the camera shutter release button 448, insuring as before that grounding actuates the signal system before exposure.

When fully automatic signal actuation is desired, as for example when the photographer wants to include himself in the photograph by using the camera delayed timing shutter release system, the timing system lever 452 is set in the usual manner by rotating the timer lever, carrying with it timer arm 454. The timer arm then uniformly rotates in the conventional manner.

When the timer arm reaches time zero it shorts out circuit 434 to the frame through contact with extension 456 on tab 458 which lies in the path of rotation of the timer arm, producing the smile/ready signal as before, just before it actuates the shutter. A fixed interval of preferably three seconds is easily achieved by cementing the tab in the appropriate position.

Swtich 440 and timer arm 454 are wired in parallel so that each can operate independently of the other.

When desired to photograph witout actuation of the signal system, the circuit slide clip connections 460, 462, can be removed to deactivate the grounding switch, the tab, or both, or switch 450 can be used for the purpose.

FIG. 4c indicates the flexibility of the means of mounting the invention. Cementing the switch in place permits it to be so positioned to the side that the user has the option to press the shutter release or both the signal switch and the shutter release, if desired.

FIG. 4d shows the simple arrangement for adding the timer arm 454. The square shaft 464 is already grounded to the camera frame. The conventional fastener, usually a screw 466, is removed from the end of the square shaft and the timer lever 452 is removed. The timer arm which is preferably made to be a pointed radial extension from the shaft with a square hole 468 to fit the shaft, is then installed over the shaft against the usual spacer 470 and the timer lever and screw are then replaced.

FIG. 4e shows an alternative version in which the timer arm 454' is provided with a round hole 468' which fits around the square shaft, and in which the periphery of the hole is distorted at 472, out-of-plane of the arm, in the manner of a lockwasher. When installed on the shaft and clamped between the timer lever and spacer this provides sufficient friction for operation but can be manually forced to rotate on the shaft to adjust the timing interval between signal and exposure.

FIG. 5 illustrates an embodiment 500 similar to that of the preceding Figures except that the timing adjustment is different, and the circuit components are shown for illustration of flexibility of the design as being built into the camera. This feature will be found particularly since cameras have release buttons at various locations, depending on type.

Tab 558 is mounted adjacent timer arm 554 as before, but the timer arm is mounted on an insulated shaft 564 and has an internal lead 574 of the circuit making the shaft carry a voltage which is grounded out on tab 558 to activate the signal system.

FIG. 6 illustrates details of an embodiment 600 in which an insulative plastic plate 676 fixed to the camera front has friction guides 678 holding opposed edges of tab 658 which has a slide clip 562 making it carry voltage as before described. The friction guides firmly hold the rectangular tab for operative purposes but permit it to be forced up and down manually, sliding to change the time interval by adjusting the extension 656 located in the sweep of the timer arm. Markings 680 on the plate indicate the adjusted position in terms of seconds of time. Intervals of one to three seconds are easily adjusted as desired.

FIG. 7 diagrams a preferred circuit 734 usable with the various embodiments.

Battery 732 has a lead 782 grounding one side to the frame of the camera. The other side of the battery has a connection 784 with a four-position switch 786. Parallel switch-output leads 788, 790 go respectively to one side of the light bulb bulb 730 for the visible signal and to one side the oscillator unit 792, solenoid, or other customary device, for the audible signal. Lead 794 runs from the other sides of these units and terminates in parallel conneton of the manual grounding switch 796 at the camera shutter release (not shown) and of the automatic timer arm switch 754, 756. The four position switch thus provides for the following selections, in addition to "off": (1) light, (2) sound and (3) both light and sound simultaneously.

FIG. 8 illustrates a quick-clamp-on embodiment 800 in which a transverse bar 898 across the bottom front of the camera connects the "C" clamp 816 at the camera shutter release button side with the housing 824 of the unit containing battery, light, oscillator and window, which mounts by a similar clamp 816' on the other side of the front of the camera 814. The timer tab 858 is affixed to the insulated upright member of the "C" clamp 816. This illustrates the flexibility of the design, which avoids interference with areas of the camera, and changes balance of the camera.

FIG. 9 illustrates a further embodiment 900 similar to previous embodiments except that a special flash unit 9102 which mounts on the flash unit mount 9104 normally provided on top of 35mm cameras is provided. The special flash unit contains not only a flash mechanism and batteries but also has the smile/ready window in front at the bottom and behind that the bulb 930 and oscillator 992 and connections from them to the flash unit batteries. Circuitry 934 connects the units in the manner described and four-position switch 986 controls it. Only one mounting is needed for this combination. The circuitry units can be cemented in place.

FIG. 10 shows an embodiment 1000 similar to the previous embodiment except that a standard flash unit 10102 is employed, somewhat modified by having an aperture 10106 in the top for connection of the smile/-ready circuit 1034 to the batteries normally employed with the flash unit and by having the housing 1024 for the invention mounted piggy-back on top of the standard flash unit. The four way switch 1086 is placed conveniently in the top of the piggy-back unit.

FIG. 11a illustrates an adjustable embodiment 1100 (camera in phantom) which a "mini-tripod" 11108 or table stand having adjustable vertical member 11110 mounted in a base 11112 and terminating at the upper end in a camera mounting screw 11114 has a transverse adjustable-slide 1116 with a "C" clamp end 11118 mounting a smile/ready housing 1124. Tab 1158 and manual switch 1118 mount on the camera 1114 by any of the arrangements previously described. This can be combined with a large variety of cameras.

FIG. 11b illustrates a preferred structure for the housing. Windows 1126 preferably are supplied as interchangeable units with a variety of faces 1120 animals, slogans or the like to suit various occasions. A slot 11122 in the side of housing 1124 permits window interchange as desired.

FIG. 12 illustrates an adjustable embodiment 1200 similar to the previous embodiment except that lead 11224 is coiled about the slide 12116 between the housing 1224 and the slide clamp. This embodiment also indicates that a standard tripod 12128 may be employed.

FIG. 13 shows an embodiment 1300 with housing 1324, adapted for hand-held use mounted on the free end of a cable release 13130 or for tripod use. The cable release plunger is prevented from grounding until depressed, as by being made shorter than usual and by being in an insulative housing. Circuitry 1334 is as described earlier, and leads from the camera to the housing are fixed to the exterior of the cable release. Power may be supplied by an 110 V ac lead and plug (not shown) or by batteries, and as in all embodiments, batteries employed may be rechargeable, or else standard dry cells, as desired. The smaller, rounded shape of necessary cells makes them especially suitable for installation behind the oscillator unit.

Temporary housing-storage is provided by a standard camera slide bracket 13116, by having a screw attachment 13132, or by similar other means of holding the housing. The bottom of the housing preferably has a "T" section adapting it for detachable attachment to a similar shape slot 13116' in the top of a flash unit 13102, in turn mounted to the camera top on a standard mount 13104.

A further feature shown is a large independent tripod-mounted housing 1324' containing a large heavy wattage bulb 1330 and large window 1328. This may be controlled by parallel connections 13134 with the smaller unit and is especially designed for studio portrait photography. It may also be used separately. Subjects may be caused to look to the side by this second means for signalling them.

FIG. 14 illustrates an embodiment 1400 compactly and conveniently fixed on top of a pistol grip movie camera 1414. The grounding switch 1418 in this embodiment is a leaf spring of stainless steel curved to fit over the camera trigger or shutter release, with an insulated portion of the grounding switch cemented to the trigger housing to space the bare portion 1418' of the grounding switch from and ahead of the camera trigger. This embodiment also can be built into the camera as an integral part of the camera. Further, this embodiment, as well as various others of the embodiments, may be installed in a quickly detachable manner using respective hook-and-loop fabric patches of "Velcro" or the like as indicated at 14136, the patches being permanently cemented to the camera and separable from each other at the hook-and-loop interface. The trigger switch can be similarly quickly mounted and detached.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system for use with a camera having a motion-actuable shutter release for taking exposures of animate subjects and the like, means for signalling said subjects before taking exposures, and means for energizing the system, the improvement comprising: the means for signalling including at least one signal remotely projectable for detection by said subject, means for insuring that said at least one signal will be given prior to taking an exposure, including a switch element positionable for covering a said shutter release and having connection for switching-on the means for signalling, and the motion for actuating a said shutter release being impartable through the switch element.

2. In a system for use with a camera having a shutter release for taking exposures of animate subjects and the like, means for signalling said subjects before taking exposures, and means for energizing the system including a switch element, the improvement comprising: the means for signalling including at least one signal remotely projectable for detection by said subjects and including a visible type signal and an audible type signal, means for selecting the type signal from among visible type signal, audible type signal, or visible and audible type signals together; a housing having a translucent panel with a design thereon and means for illuminating the translucent panel from behind for producing the visible type signal, the means for signalling comprising a unitary device including means for detachably affixing the means for signalling to a camera, the means for detachably affixing including a "C" shaped structure for frictionally mounting the housing to a said camera, a portion of the "C" shaped structure being the swtich element.

3. A system as recited in claim 2, the "C" shaped structure having an upright portion positionable on the front of the camera and terminal portions for clamping the top and bottom of said a camera, and the housing being a supportive fixed part of the upright portion.

4. In a system for use with a camera having a shutter release for taking exposures of animate subjects and the like, means for signalling said subjects before taking exposures, and means for energizing the system, the improvement comprising: the means for signalling including at least one signal remotely projectable for detection by said subjects and including a visible type signal and an audible type signal, means for selecting the type signal from among visible type signal, audible type signal, or visible and audible type signals together; said camera being of the type having a pistol grip and a trigger-type shutter release, the means for signalling having a housing, means for mounting the housing on a said camera, and the means for energizing the system including means for securing in spaced relation over a said trigger-type shutter release.

5. In a system for use with a camera having a shutter release for taking exposures of animate subjects and the like, means for signalling said subjects before taking exposures, and means for energizing the system including a switch element, the improvement comprising: a housing having a translucent panel with a design thereon and means for illuminating the translucent panel from behind for producing the visible type signal, the means for signalling comprising a unitary device including means for detachably affixing the means for signalling to a camera, the means for detachably affixing including a "C" shaped structure for frictionally mounting the housing to a said camera, a portion of the "C" shaped structure being the switch element.

6. In a system for use with a camera having a trigger type shutter release for taking expsoures of animate subjects and the like, means for signalling said subjects before taking exposures, and means for energizing the system, the improvement comprising: the means for signalling having a housing, means for mounting the housing on a said camera, and means for securing in spaced relation over a said trigger-type shutter release for energizing the means for signalling.

* * * * *